INVENTOR.
CARL F. LEGRADY ~AND~
DAVID WRIGHT.
BY
ATTORNEY.

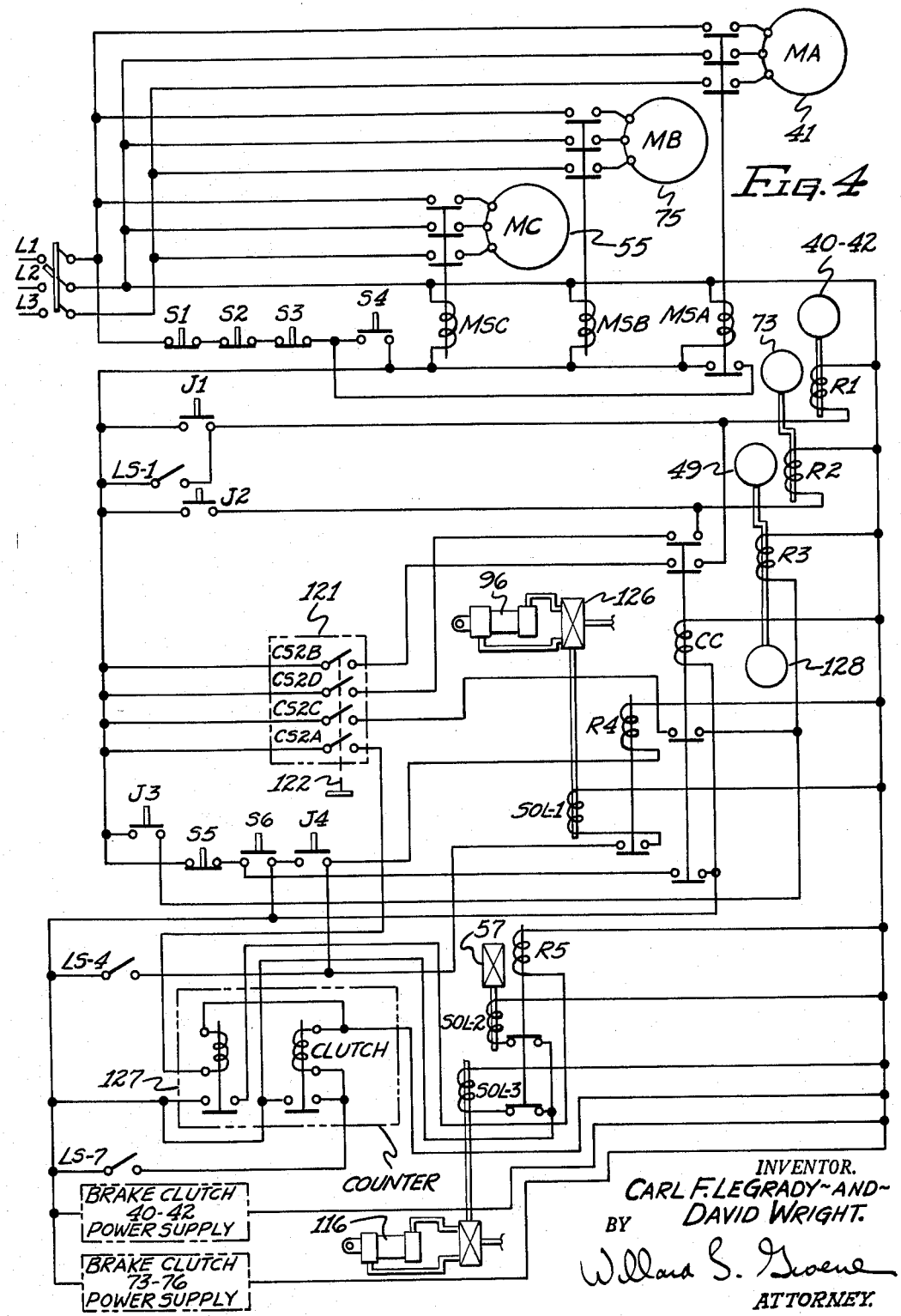

Oct. 26, 1965  C. F. LE GRADY ETAL  3,213,898
WIRE JOINT REINFORCING MAKING MACHINE
Filed May 1, 1961  7 Sheets-Sheet 5

INVENTOR.
CARL F. LE GRADY ~AND~
BY   DAVID WRIGHT

ATTORNEY.

INVENTORS.
CARL F. LE GRADY -AND-
DAVID WRIGHT
BY
Wm. H. Dean
AGENT

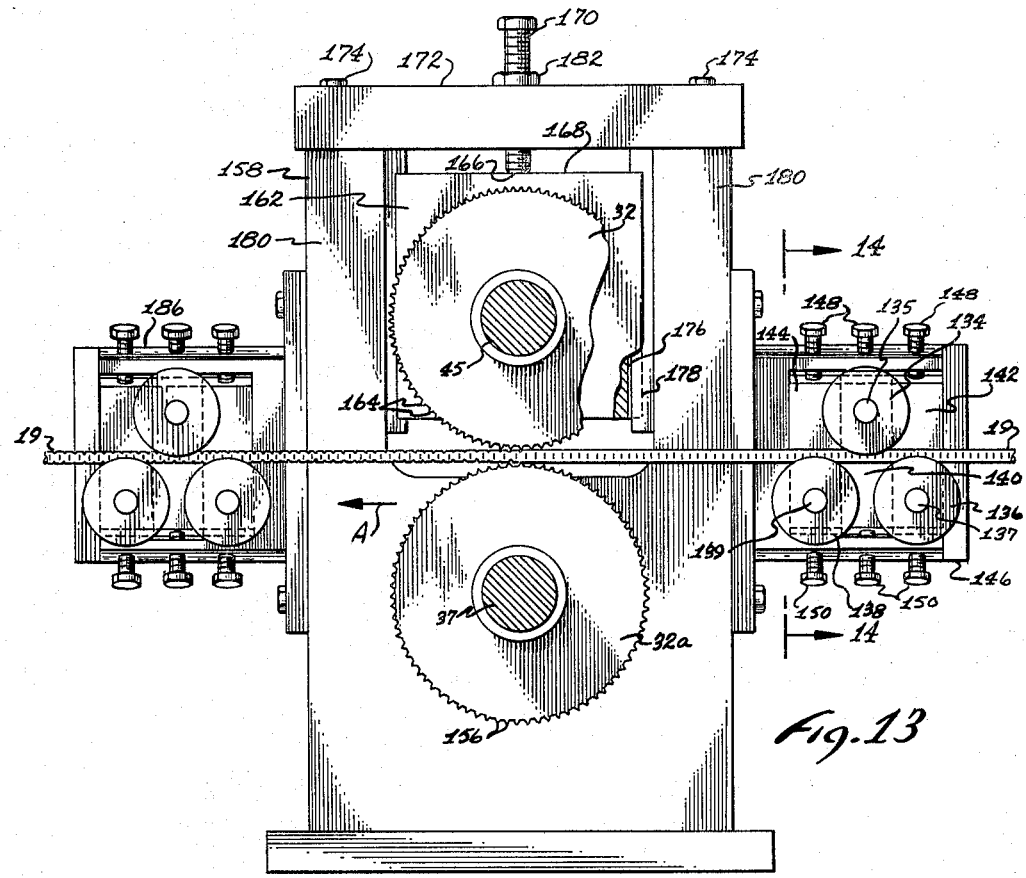
Fig. 13
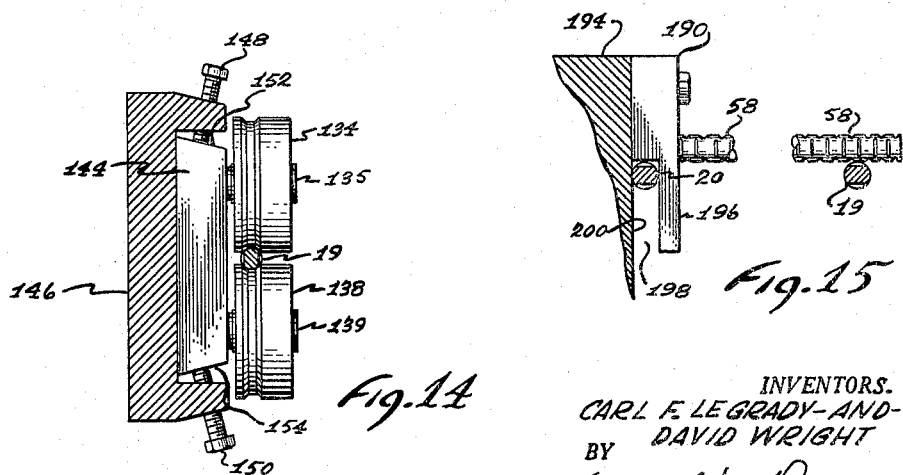
Fig. 14
Fig. 15
INVENTORS.
CARL F. LE GRADY- AND-
DAVID WRIGHT
BY
Wm. H. Dean
AGENT United States Patent Office 3,213,898
Patented Oct. 26, 1965

3,213,898
WIRE JOINT REINFORCING MAKING MACHINE
Carl F. Le Grady and David Wright, Phoenix, Ariz., assignors to Arco Products, Inc., Phoenix, Ariz., a corporation of Arizona
Filed May 1, 1961, Ser. No. 108,703
18 Claims. (Cl. 140—112)

This application is a continuation-in-part of our former patent application for Wire Joint Reinforcing Making Machine, Serial No. 828,637, filed July 21, 1959, now abandoned.

This invention pertains to automatic machines for making wire joint reinforcing for masonry walls.

One of the objects of this invention is to provide a machine for making a double strand welded deformed wire fabrication of high tensile strength drawn wire for use as a joint reinforcement in masonry walls.

Another object of this invention is to provide such a machine and method of procedure as to automatically fabricate by welding process a pair of parallel longitudinal wires together with a series of longitudinally spaced cross wire to form a wire joint reinforcing unit.

Another object of the invention is to provide a machine which produces very accurate and straight reinforcing wire assemblies for incorporation into concrete block and/or brick walls; said reinforcing wire assemblies being composed of spaced parallel longitudinal members interconnected by short transverse wire members welded thereto.

Another object of the invention is to provide a machine having serration forming rollers disposed adjustably to attain varying depths of serrations in spaced parallel wires being formed into a reinforcing wire assembly whereby adjustment of said serrated rollers and the depth of the serrations formed in the wires may serve to control the elongation of said wires and therefore the straightness of the assembly or the relative parallelism and straightness of said spaced parallel wires.

Another object of the invention is to provide a machine having novel wire drive means comprising serration producing roller mechanisms intermittently driven by a motor having magnetic clutch and brake controls electrically energized through sequence switching means driven in unison with said serrated rolls.

Another object of the invention is to provide a machine for producing concrete block and/or brick wall reinforcing wire assemblies very reliably, very accurately and at a high rate of production with a minimum of downtime and maintenance.

Another object of the invention is to provide a machine for producing reinforcing wire assemblies comprising a welding head; spaced guide means for guiding parallel wires into accurate juxtaposition with relation to the welding head and serration producing rollers drivably engaging said wires and adjustable so as to attain varying degrees of compression of each wire whereby adjustment of these rollers may be made to control the axial elongation of the wires and consequently the straightness and accuracy of the reinforcing wire assembly as it passes under said welding head.

Another object of this invention is to provide a wire fabrication by automatic means for use in masonry wall structures of buildings to give much greater durability and to control the volume change of masonry wall units to prevent objectional mortar joint cracking.

Still another object of this invention is to provide a machine for making wire joint reinforcing units of cross members which may be incorporated in the mortar joints of masonry walls to bring the standard of such walls to current building code specifications and thereby making possible the use of concrete block building units which would otherwise not be adequate for use in the wall structures.

And it is a further object of this invention to provide a high production machine which is fully automatic for straightening, deforming, and welding a prefabricated joint reinforcement unit for use in connection with mortar joints of masonry walls.

Further features and advantages of this invention will appear from a detailed description of the drawings in which:

FIG. 4 is an electric wiring diagram for the control apparatus of the machine.

FIG. 8 is a perspective view of one of the completed wire joint reinforcing units.

FIG. 9 is an enlarged transverse view through a masonry wall and joint showing the application of the wire joint reinforcing unit thereto.

FIG. 10 is an enlarged fragmentary section on the line 10—10 of FIG. 1.

FIG. 11 is an enlarged fragmentary section on the line 11—11 of FIG. 10.

FIG. 13 is an enlarged fragmentary sectional view taken from the line 13—13 of FIG. 12.

FIG. 14 is an enlarged sectional view taken from the line 14—14 of FIG. 13; and

FIG. 15 is an enlarged fragmentary sectional view taken from the line 15—15 of FIG. 12.

Figure 1:
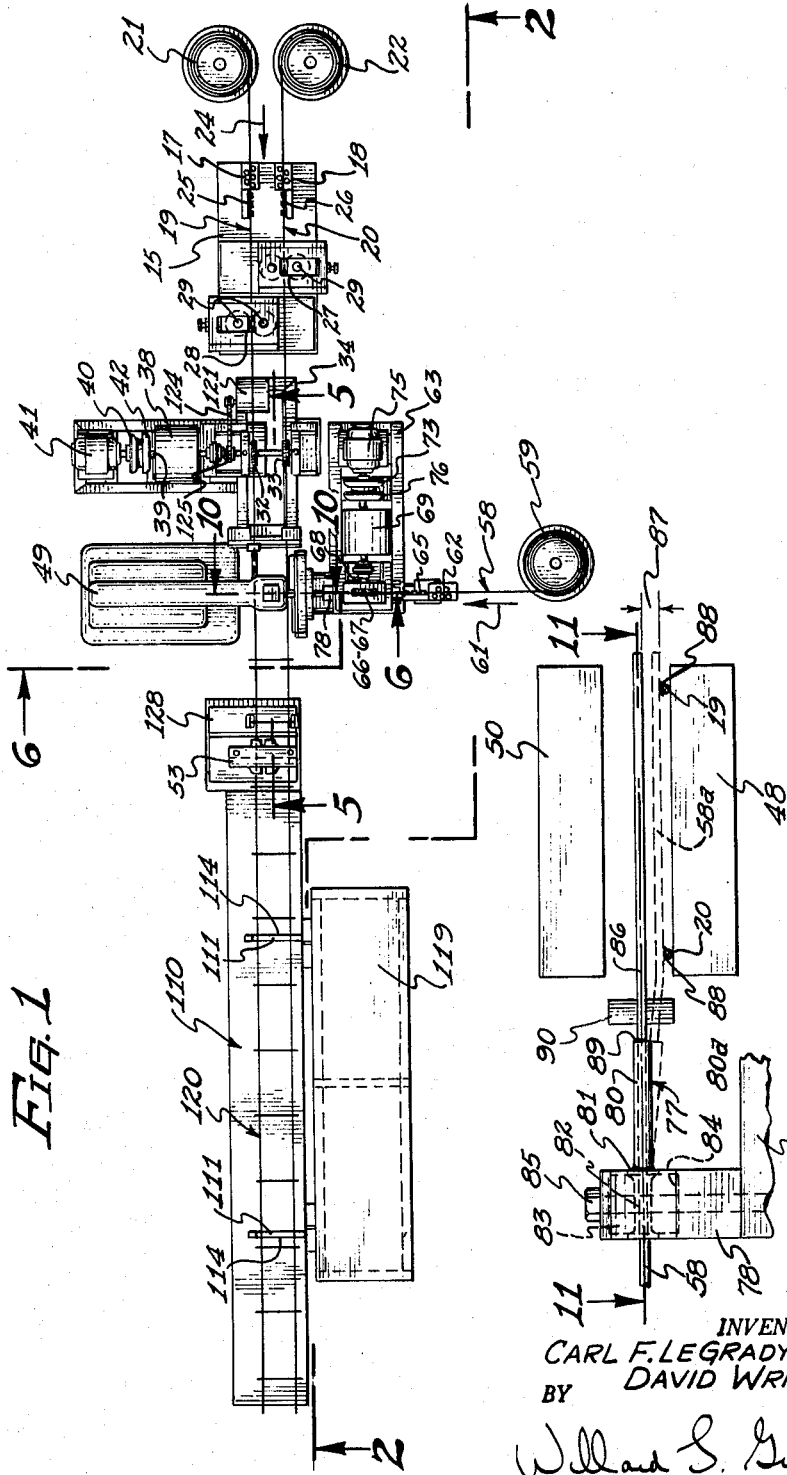
FIG. 1 is a plan view of a wire joint reinforcing making machine incorporating the features of this invention.

As an example of one embodiment of this invention there is shown a wire joint reinforcing making machine having a frame 15 supported on suitable legs 16. On top of the frame 15 is mounted the horizontal wire straightening rollers 17 and 18 each of which receive the side or longitudinal wires 19 and 20 from supply reels 21 and 22 respectively carried on suitable pedestals 23. In the operation of the machine the side wires move in the direction indicated by the arrow 24 so that after leaving the horizontal straightening rollers 17 and 18 the side wires pass respectively through vertical straightening rollers 25 and 26 suitably mounted on the frame 15. Each wire 19 and 20 then passes between the side serrating roller units 27 and 28. Each of the pairs of rollers 27 and 28 are suitably journaled on the frame 15 to revolve about vertical axes 29 at predetermined fixed distances each side of the wires so that the serrations 30 on the periphery of the rollers 27 and 28 are embedded in and form vertical grooves 31 in the sides of the wires, FIG. 9, as the wires pass through the rollers 27 and 28.

The side wires 19 and 20 are fed through the machine in the direction of the arrow 24 by pairs of driven top-and-bottom serrating rollers. One pair comprises a top roller 32 and a bottom roller 32a while the other pair comprises a top roller 33 and a bottom roller 33a. The bottom rollers 32a and 33a of each pair are fixed to an output drive shaft 37 of a speed reducer unit 38 mounted on the frame 34. The input shaft 39 of the speed reducer unit 38 is connected through an electrically operated clutch 40 to a constantly operating drive motor 41 mounted on the frame 34. A suitable electrically operated brake 42 is carried on the frame 34 and is adapted to arrest rotation of the input shaft 39 whenever clutch 40 is released. A set of idler top serrating rollers of the pairs of rollers are mounted on the idler shaft 45 suitably journaled on the frame 34 so that as the shaft 37 is driven the serrations on the peripheries of the rollers embed themselves in the top and bottom portions of the longitudinal side wires 19 and 20, as shown in FIG. 9, while at the same time advancing these wires by pushing them in the direction of the arrow 24 when the clutch 40 connects shaft 39 to the motor 41.

Figure 12:
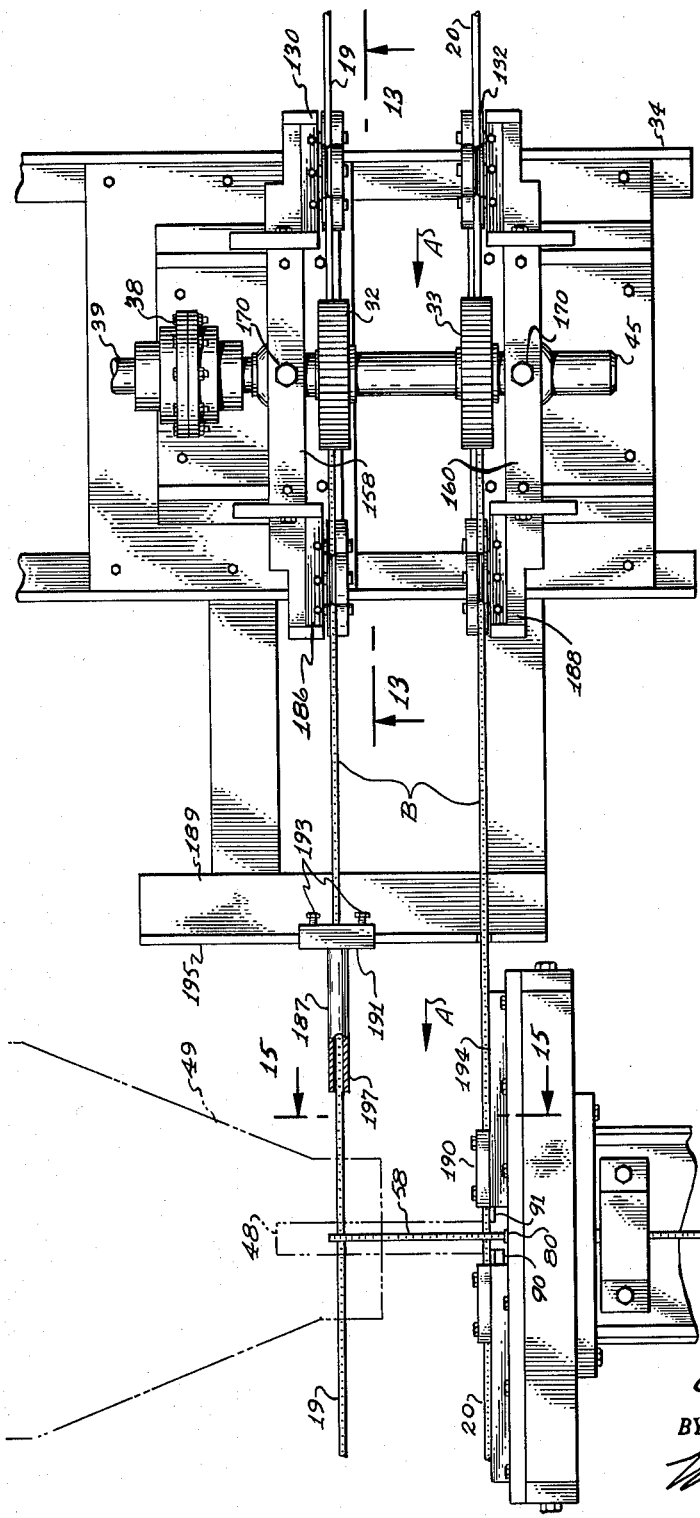
FIG. 12 is an enlarged fragmentary plan sectional view of the wire drive and welding section of the machine in accordance with the present invention.

Referring now to FIG. 12 of the drawings and to details of the wire drive and straightening mechanism of the present invention, it will be seen that the wires 19 and 20 in their approach to the drive and serrating rollers 32, 32a and 33 and 33a pass in a direction of the arrow A in FIG. 12 of the drawings. These wires 19 and 20 having been serrated on their sides by the rollers 27 and 28 require straightening before they enter positions between the rollers 32 and 32a and the roller 33 and 33a, respectively.

Accordingly, immediately following the passage of the wires between the respective pairs of wire side serrating rollers 27 and 28 the wires 19 and 20 pass through groups of straightening rollers 130 and 132, respectively.

These groups of straightening rollers 130 and 132 are similar and therefore reference is made to FIGS. 13 and 14 showing detail construction of these straightening rollers. The group of straightening rollers 130 acting on the wire 19 is similar to the group of straightening rollers 132 acting on the wire 20.

The group of straightening rollers 130 includes three rollers 134, 136 and 138 rotatably mounted on relatively adjustable support blocks 140, 142 and 144, respectively. These blocks are reciprocally mounted in a frame 146 and are adjustable therein laterally of the axes of the rollers 134, 136 and 138 by means of adjusting screws 148 and 150 which engage opposite ends of these blocks 140, 142 and 144. The blocks are provided with tapered ends 152 and 154 as shown in FIG. 14 of the drawings and the screws 148 and 150 bear on these tapered ends to hold the roller supporting blocks securely in the frame 146 and in certain adjusted position laterally of the axes of the rollers 134, 136 and 138. These rollers are mounted on cantilever axles 135, 137 and 139 projecting from the sides of the blocks 140, 142 and 144, respectively.

It will be appreciated that these straightening rollers 134, 136 and 138 prepare and guide the wires 19 and 20 for entrance between the rollers 32, 32a, 33 and 33a which drive these wires longitudinally of their axes and provide for relatively deep surface serrations in the upper and lower portions thereof.

As shown in FIG. 13 of the drawings the roller 32a is provided with surface serrations 156 in the periphery thereof and this roller is mounted on the shaft 37 having bearings supporting the same stationarily in upstanding frame sections 158 and 160. Thus, the serrating roller 32a is stationary laterally of its axis at the center of the shaft 37 while the roller 32 is adjustable laterally of its axis passing therough the center of the shaft 45. The shaft 45 is mounted in bearings carried by vertically adjustable slide plates 162 in the frame sections 158 and 160. The roller 32 is provided with serrations 164 in its periphery and these serrations are adapted to cooperate with the serrations 156 to provide serrated portions in the upper and lower surfaces of the wire 19 and to thereby frictionally engage the same to drive it longitudinally as will be hereinafter described.

Construction and cooperative relationship of the rollers 33 and 33a is similar to that of the rollers 32 and 32a.

Each slide plate 162 in each of the frame sections 158 and 160 is engaged at its upper surface 166 by a normally lower end 168 of an adjusting screw 170 which is screw threadably mounted in a cross member 172 forming a portion of the frame section 158. Bolts 174 secure the cross member 172 to the upper portion of the frame section 158.

The slide plate 162 is provided with groove portions 176 in its opposite edges and these groove portions ride vertical rails 178 of upstanding leg portions 180 of the frame section 158. Thus, each frame section 158 and 160 is provided with a vertical slide plate 162 which carries bearings supporting the shaft 45 to thereby permit vertical adjustment of the shaft 145 laterally of its axis whereby the rollers 32 and 33 carried thereon may be moved vertically with respect to the rollers 32a and 33a.

The lower ends of the screws 170 bearing on the upper portions of the slide plates 162 permit vertical force to be applied to these slide plates in order to force the serrating rollers 32 and 33 downwardly toward the serrating rollers 32a and 33a in order to cause their peripheral serrations to be embedded into the upper and lower surfaces of the wires 19 and 20 to a desired degree of depth in deformation. It will be appreciated that the depth of deformation of the wire when forming the serrations in the upper and lower surfaces of the wires 19 and 20 depends upon the adjustment of the screws 170 as hereinbefore described.

It will be understood by those skilled in the art that in the event the rollers 32 and 32a are closer together at their peripheries than are the rollers 33 and 33a that the wire 19 passing between the rollers 33 and 33a will be more deeply serrated with a greater corresponding longitudinal set or elongation of the wire 19. It is therefore important that the adjustment of the screws 170 in the frame sections 158 and 160 compensate so that the wires 19 and 20 are elongated an equal amount. Otherwise the reinforcing wire sections will be curved laterally of a horizontal plane and difficult to place in a straight wall.

Each of the adjustment screws 170 may be locked in place by a lock nut 182 to maintain the spacing of the rollers 32 and 32a and the rollers 33 and 33a. Thus, each wire 19 and 20 will be elongated by the longitudinal set created therein when the serrations in the upper and lower surfaces are formed by the serrations of the pairs of rollers.

As the wires pass beween these serrating rollers power applied to the shaft 37 as hereinbefore described, furnishes the motive force to move these wires by pushing them in the direction of the arrow A from the serrating rollers toward additional groups 186 and 188 of straightening rollers which are similar in construction and operation to the groups 130 and 132 of straightening rollers hereinbefore described. These groups of straightening rollers 186 and 188 provide for straightening of the wires 19 and 20 after they leave the serrating and drive rollers 32, 32a, 33 and 33a in the direction of the arrow A shown in FIG. 13 of the drawings.

These groups of rollers 186 and 188 straighten the wires 19 and 20 to compensate for any curved condition, above or below a horizontal plane, imparted by the serrating rollers 32, 32a, 33 and 33a when forming serrations in the upper and lower surfaces of the wires 19 and 20. Thus, the wires 19 and 20 at a location B as shown in FIG. 12 of the drawings are in straight condition as they pass toward the welding head 49 in a direction of the arrow A. The wire 19 passes through a guide tube 27 which is adjustably supported on an angle bracket 189 by clip supports 191 having set screws 193 screw threaded therein and engaging an upstanding leg 195 of said angle member 189. The guide tube 187 at its extended end 197 is in close proximity to the anvil 48 of the welder 49, whereby accuracy of the lateral alignment and spacing of the wire 19 relative to the wire 20 is maintained since the wire 20, in close proximity to the anvil 48, is held in precise lateral position by a guide 190 disposed adjacent one side of the cross wire 58 as shown best in FIG. 12 of the drawings.

Referring to FIG. 15 of the drawings it will be seen that the guide 190 is fixed in contiguous relationship with a surface 200 of a stationary frame member adjacent the knives 90 and 91. The guide 190 is provided with an offset leg portion 196 providing a space 198 between its leg and a surface 200 of the frame member 194. This space 198 is very slightly greater than the diameter of the wire 20 whereby it very precisely guides the wire 20 to maintain it accurately spaced laterally of the wire 19. Thus, the longitudinal wires 19 and 20 are accurately spaced by the guides 187 and 190 during welding of the cross wire 58 thereto as hereinbefore described.

It will be appreciated by those skilled in the art that straightening rollers 130 and 132 straighten the wires 19 and 20 so that they may accurately be directed between the serrating and drive rollers 32 and 32a and the serrating and drive rollers 33 and 33a, respectively, and that the relatively spacing of these pairs of serrating and drive rollers may be controlled by adjustment of the screws 170 hereinbefore described to control the relative elongation of these wires 19 and 20 as the permanent serration sets are made in the upper and lower surfaces of the wires 19 and 20. Thus, the longitudinal set or elongation provided by the serrations in the upper and lower surfaces of the wires 19 and 20 may be compensated by adjustments of the screws 170 so that neither wire 19 or 20 is elongated more than the other wire whereby the assembly of the longitudinal reinforcing wires 19 and 20 with the cross wires 58 will be straight and true.

The straightening rollers 186 and 188 also cooperate to maintain straightness of the wires 19 and 20 by preventing curvature thereof above and below the horizontal so that neither of the wires 19 and 20 is ultimately longer than the other to create curvature or waviness of the assembly of the wires 19 and 20 with the cross wires 58.

The guides 187 and 190 maintain precise lateral spacing of the wires 19 and 20 so that accuracy may be attained in the welding operation and thereby prevent errors in the lateral spacing of the longitudinal wires 19 and 20 at their welds on the cross wires 58. All of these factors maintain accuracy of fabrication and result in a very accurate product which may readily and easily be installed in straight wall structures. Otherwise, an accumulation of errors during several welding operations might result in a very crooked and wavy assembly of the longitudinal wires 19 and 20 and the cross wires 58 whereby usefulness of the reinforcing assembly would be greatly impaired since the assembly might not be straight laterally and might be wavy from a vertical standpoint so that it could not properly be laid in mortar between superimposed tiers or layers of concrete blocks.

As the side wires leave the drive rollers 32–33 they pass over the anvil electrode 48 of the welding unit 49. This unit 49 is of conventional construction having the usual vertical reciprocatable electrode 50 movable up and down by the usual mechanism (not shown) relative to the anvil electrode 48. Since the details of construction and operation of the welding unit 49 are conventional and form no part of this invention, it is sufficient to state that when suitably energized, the electrode 50 moves down against the anvil 48 to effect a weld between parts placed between the electrodes 48–50.

After passing between the welding unit electrodes 49, the side wires then pass between the knives 51 and 52 of the cut-off punch press unit 53 having the usual flywheel 54, drive motor 55, belt 56, and electrically operated trip clutch all of conventional type requiring no further detailed description herein.

The cross wire 58 supply is derived from the cross wire reel 59 carried on a suitable pedestal 60. The cross wire 58 moves in the direction indicated by the arrow 61 and first passes through the horizontal straightening rolls 62 suitably mounted on the frame 63 carried on the legs 64. The cross wire then passes through the vertical straightening rolls 65 mounted on the frame 63 and then between the serrated drive rollers 66 and 67 having serrated peripheral surfaces 67a engaging the bottom and top of the wire 58. The idler roller 67 is suitably journaled on the frame 63 while the roller 66 is fixed on the output shaft 68 of the speed reducer 69 mounted in the frame 63, the serrated surfaces 67a forming the serrations 70 and 71 on the bottom and top of the cross wires 58, FIG. 9. The speed reducer 69 has its input shaft 72 connected through an electrically operated clutch 73 to the drive shaft 74 of the continuously operating motor 75. An electrically operated brake 76 carried on the frame 63 is adapted when appropriately operated to lock the shaft 72 against rotation.

Figure 6:
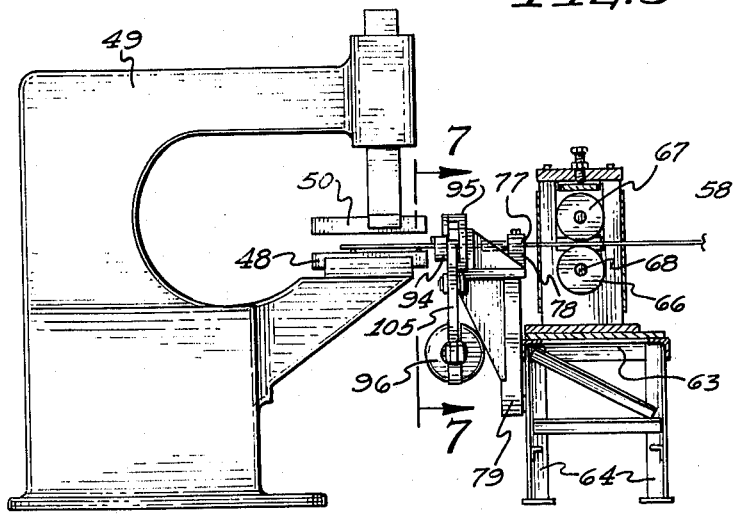
FIG. 6 is an enlarged transverse section through the machine on the line 6—6 of FIG. 1.

After the cross wire 58 leaves the serrated drive rollers 66–67, it passes through the guide bushing 77 carried on a support 78 adjustably fixed to the bracket 79 mounted on the frame 63, FIG. 6. The bushing 77 comprises the tube 80 having a bore to slidingly receive the cross wire 58 and includes a flange portion 81 and shank 82 vulcanized or otherwise secured to a flexible bushing 83 of rubber or plastic fixed in the bore 84 of the support 78 fixed to the bracket 79 by suitable bolts 85. Normally the tube 80 is positioned with the axis 86 of its bore and cross wire in the horizontal position shown in FIG. 10 so that as the cross wire is ejected from the tube 80 by the operation of the drive rollers 66 and 67 it will pass above the side wires 19 and 20 at a spaced distance 87. When the top electrode 50 of the welding machine comes down on the cross wire 58, the tube 80 in the rubber bushing 83 yields and allows the tube 80 to bend down to the position 80a to force the cross wire 58 down on top of the side wires 19 and 20 as shown at 58a at which instant welding current is applied across the electrodes 48 and 50 to effect a weld at the points 88. As soon as the upper electrode 50 returns upwardly the rubber bushing 83 returns the tube 80 back to normal position on the axis 86 ready for the next presentation of the cross wire over the side wires 19 and 20. By this arrangement the cross wire is always fed out above the side wires without the cross wire engaging the side wires to avoid the necessity of maintaining any predetermined close positioning between these wires prior to the welding operation.

Figure 7:
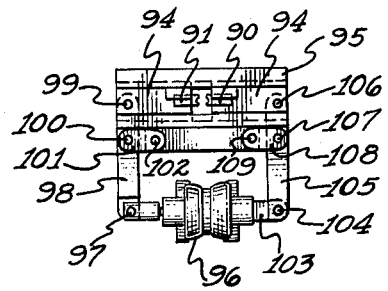
FIG. 7 is an enlarged section of the cut-off shear unit indicated by the lines 7—7 of FIG. 5.
Figure 5:
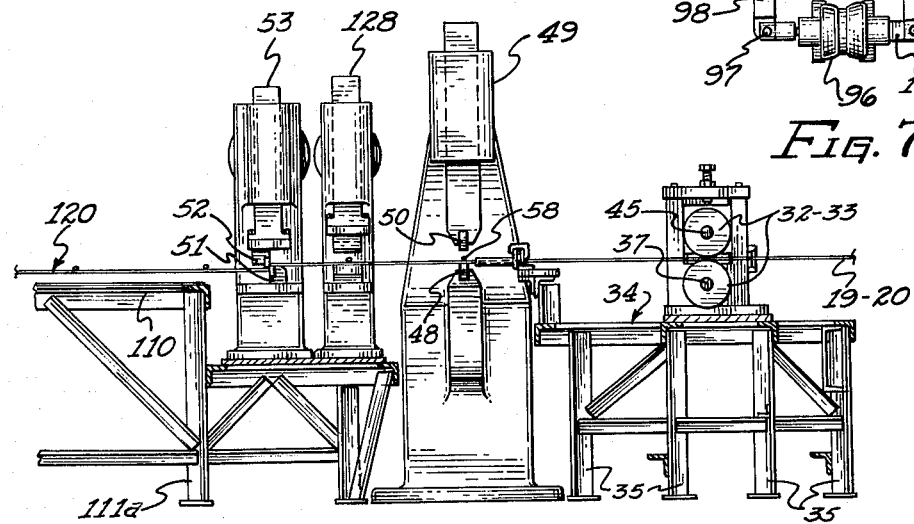
FIG. 5 is an enlarged fragmentary front elevation showing particularly the welding and cut-off units of the machine, indicated by the line 5—5 of FIG. 1.

Between the discharge end 89 of the tube guide 80 and the side wire 20, and closely adjacent to the latter are a pair of oppositely reciprocatable knives 90 and 91 having the respective cutting edges 92 and 93, FIGS. 7 and 11, adapted to engage the sides of the cross wire 58 to shear off the same after the completion of the aforedescribed welding operation. Each of the knives 90 and 91 are suitably fixed in slides 94 supported in the frame 95 fixed on the bracket 79 of the frame 63. An air actuated cylinder 96 is pivotally connected by a pin 97 to the lower end of the arm 98, the upper end of which is pivotally connected by a pin 99 to the slide 94 for the knife 91. The arm 98 is pivotally mounted intermediate its ends on a pin 100 of a link 101 in turn pivotally connected by a pin 102 on the frame 95. The outer end of the piston rod 103 of the air cylinder 96 is pivotally connected by a pin 104 with the lower end of the arm 105 pivotally mounted at its upper end by a pin 106 on the frame 95 and connected intermediate its ends by a pin 107 to a link 108 in turn pivotally connected to the frame 95 by a pin 109. By appropriately applying air pressure to the cylinder 96 the knives 90–91 cut off the cross wire 58 by simultaneously engaging both sides of the wire and without causing any lateral displacement of the wire.

Figure 2:
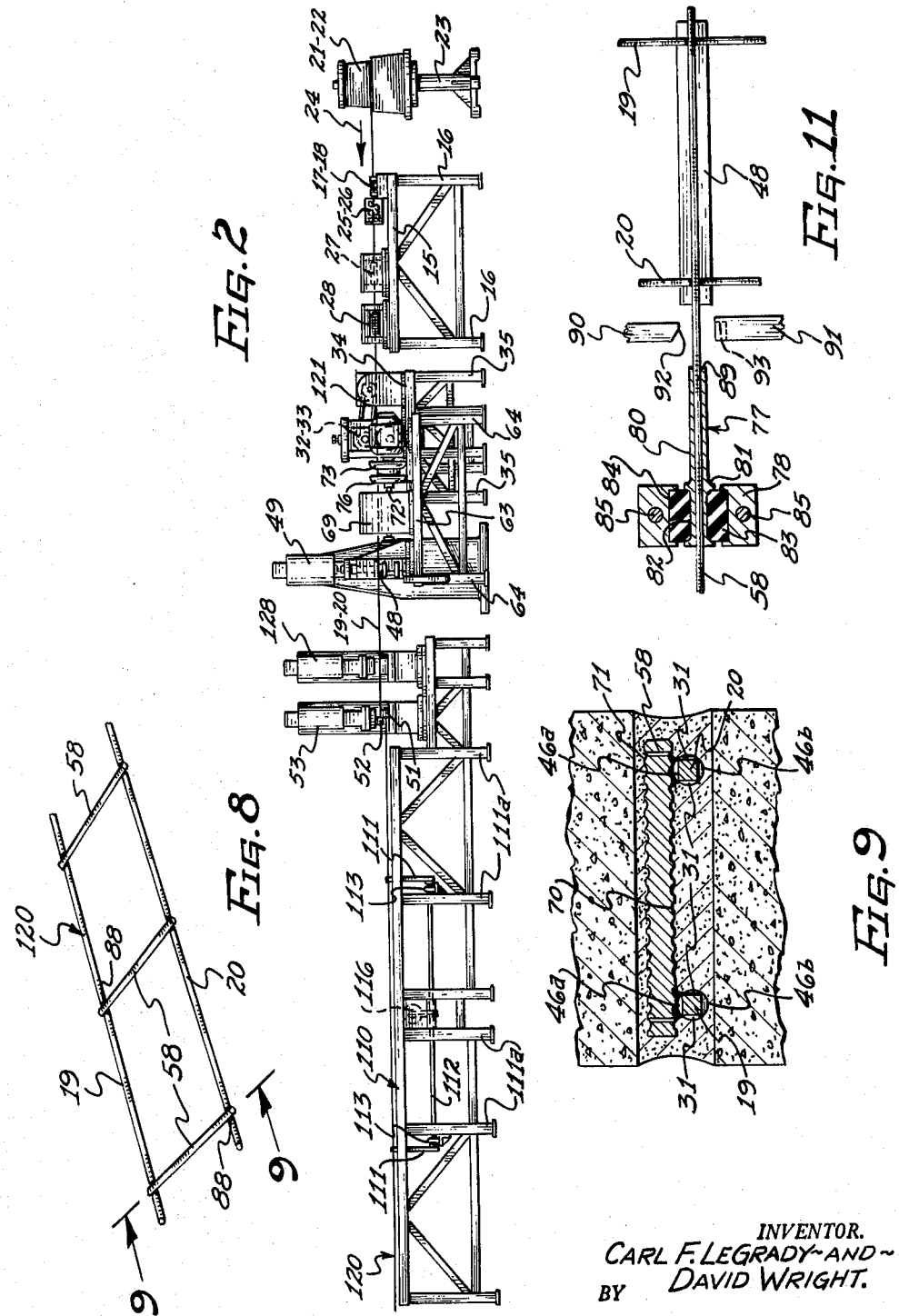
FIG. 2 is a front elevation of the machine shown in FIG. 1.

Beyond the end shear 53 and its knives 51 and 52 is the runout table 110 carried on suitable legs 111a. The runout table 110 receives the reinforcing wire as it proceeds through the machine and is cut off to desired lengths by the knives 51–52. Kickoff arms 111 are fixed at their lower ends on a workshaft 112 journaled in suitable bearings 113, FIG. 2, supported on the legs 111a. The upper ends of the kickoff arms 111 swing in the slots 114 in the table 110 as indicated by the arrows 115. An air operated cylinder 116 is fixed to the legs 111a and has its piston rod 117 connected to the clevis 118 fixed to the workshaft 112 so that by appropriately energizing the cylinder 116 the kickoff arms 111 delivers the cutoff reinforcing units 120 to an appropriate pallet 119 or other appropriate work consolidating, stacking and handling device.

Figure 3:
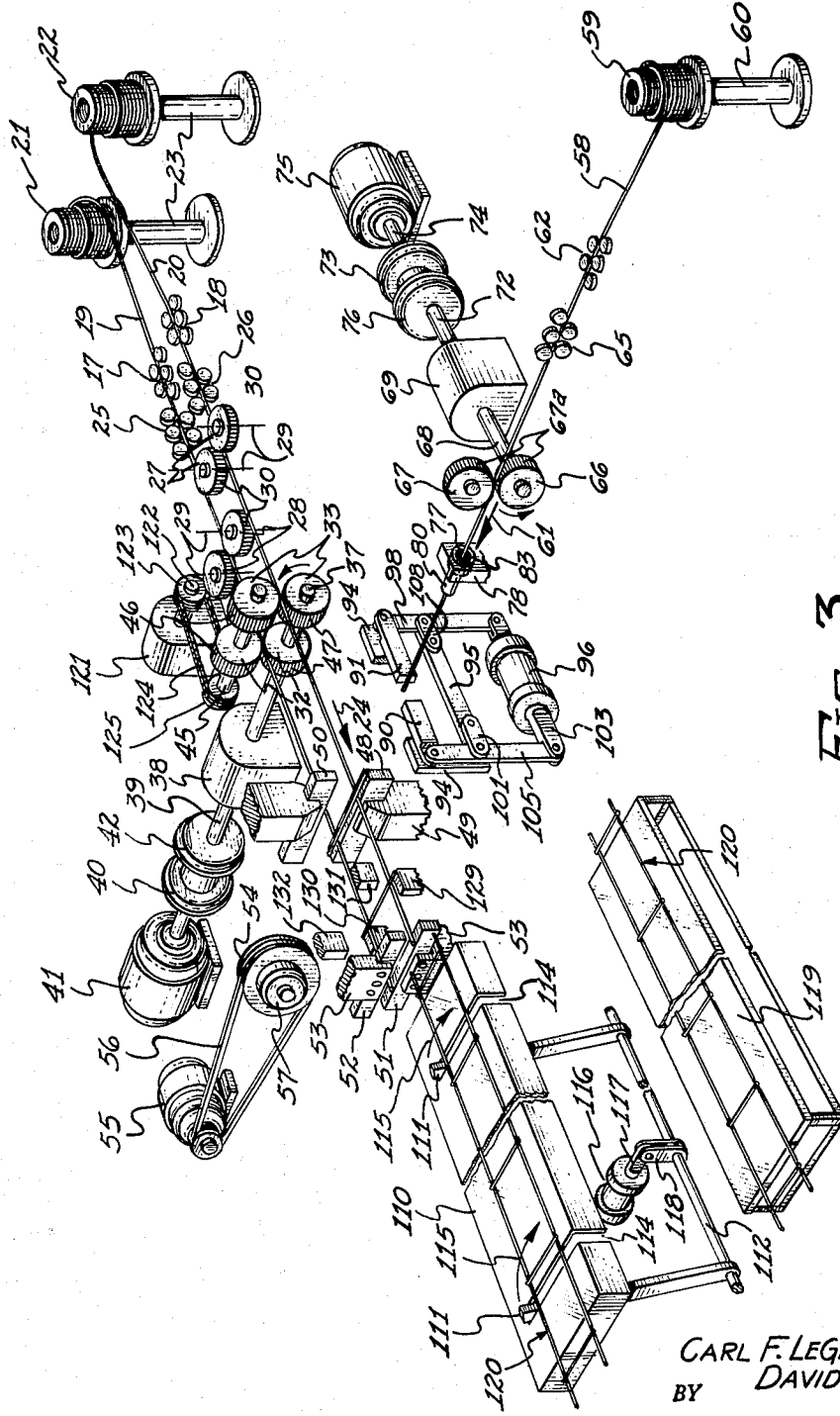
FIG. 3 is a schematic perspective diagram showing the essential operating elements of the machine illustrated in FIGS. 1 and 2.

A main sequence control cam switch 121 has an operating cam shaft 122, FIG. 3, upon which is mounted a sprocket 123 over which operates the chain 124 which in turn operates over the sprocket 125 fixed on the idler shaft 45 of the drive rollers 32–33 so that the cam switch 121 operates in a predetermined timed relationship with the travel of the side wires 19 and 20 during the operation of the machine.

In certain instances it may be desirable to utilize an additional cross wire cutoff punch press unit 128 between the welding unit 49 and the cross wire cutoff punch press unit 53 having bottom knives 129 and 130 and top knives 131 and 132 closely positioned each side of the side wires 19 and 20 for cutting and trimming the cross wire 58 to precise length at the same time that the welding operation is taking place.

Since the detailed structure of the electrical system for the operation of the machine forms no specific part of this invention, a generalized discussion of the operation of the machine will be sufficient. With the motors 41, 55 and 75 energized for continuous operation and a suitable source of fluid pressure provided for the air cylinders 96 and 116, the side wire drive clutch 40 is energized by appropriate operation of the cam switch 121 which connects motor 41 to drive the feed rollers 32–33 moving the side wires 19 and 20 a predetermined distance in the direction of the arrow 24. At the same time cross wire drive clutch 73 is energized appropriately by the cam switch 121 to cause drive motor 75 to operate rollers 66–67 to feed the cross wire 58 a predetermined distance in the direction of the arrow 61. As soon as the prescribed amounts of side wires 19 and 20 and cross wire 58 have been fed out, clutches 40 and 73 are deenergized and the respective brakes 42 and 76 energized locks the respective rollers 32–33 and 66–67 against rotation. At this point the cam switch 121 starts the welding cycle by energizing the welding machine unit to go through its appropriate cycle bringing electrodes 48–50 together to weld the side wire on top of the cross wires 19 and 20. As the welder 49 completes its operating cycle the upward movement of the electrode 50 normally open limit switch LS–1 is closed which operates appropriate control valve 126 to apply fluid pressure to the cylinder 96 to cause knives 90–91 to cut off cross wire 58. Cylinder 96 is then deenergized to retract the cutoff knives whereupon limit switch LS–4 is closed which starts the side wire drive by energizing clutch 73 and deenergizing brake 76 and to move cam switch 121 from off position restarting above recited cycle.

After a certain desired number of cross wires 58 have been welded to the side wires 19 and 20 during the above described operation, the clutch 57 of the cutoff dies 51–52 is energized to cut off the side wires 19 and 20 of the section run out on the table 110. This is accomplished by the counter which is impulsed by the cam or sequence switch 121 controlling set at 180 degrees to the side wire drive control cam of the cam switch. After a present count, impulse makes electrical contact which energizes the shear clutch 57 to cut off side wires 19 and 20 to unit length and then start push-off arms 111 to clear runout table 110. The pushoff arms 111 then engage limit switch 7 which resets the counter 127 and returns push-off arms to starting position ready to resume the next cycle. The wiring diagram, FIG. 4, is an example of one preferred form of circuitry for exerting the above functions.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and described to be obtained by United States Letters Patent is:

1. The method of making wire joint reinforcing units wherein there are a pair of parallel wires and cross-wires welded thereto at precisely spaced positions longitudinally of the parallel wires; the method consisting in intermittently pushing and thereby moving a pair of parallel side wires predetermined longitudinal distances thereby effecting a measurement precisely between areas of said parallel wires at which said cross-wires are to be welded; simultaneously serrating said side wires by means of serrating rollers, which effect said pushing movement of the wires said predetermined distances; flexibly supporting and moving a cross-wire at right angles to and normally spaced laterally relative to said parallel side wires to prevent interference of said cross-wire with said wires to prevent bending of said wires; alternately rotating and stopping rotation of said serrating rollers for alternately moving said side wires longitudinally of their axes and momentarily stopping said side wires; welding said cross-wire to said side wires when all of said wires are momentarily stopped, cutting off said cross wire adjacent one of said side wires while all of said wires are stopped, and finally cutting off said side wires after a predetermined member of said cross wires have been welded thereto.

2. A wire joint reinforcing machine comprising means for intermittently longitudinally feeding a pair of parallel side wires, means for intermittently longitudinally feeding a cross wire at right angles to said side wires, flexible means for guiding and holding said cross wire normally in spaced relation with said side wires; means for welding said cross wire to said side wires, means for cutting off said cross wire adjacent one of said side wires after said welding operation, and automatic means for cutting off said side wires after a predetermined number of cross wires have been welded and cut off relative to said side wires.

3. In a wire joint reinforcing machine as set forth in claim 2 wherein there is provided means for simultaneously trimming the ends of said cross wires closely adjacent said side wires during said welding operation, said means being located between said welding unit and said side wire cutting off means.

4. A wire joint reinforcing making machine having a frame, serrated side wire drive rollers journaled on said frame disposed to push and feed a pair of parallel side wires, a drive motor on said frame for rotating said rollers including a transmission having a clutch for intermittently connecting and disconnecting said drive motor from said rollers and a brake on said frame for arresting rotation of said side wire drive rollers, cross wire drive rollers journaled on said frame for longitudinally feeding a cross wire at right angles to said pair of side wires in a plane parallel to a plane defined by the axes of said side wires and spaced to one side thereof, welding electrodes on said frame including at least one movable relative to said side wires for welding said cross wire to said side wires by welding pressure exerted at right angles to said plane defined by the axes of said side wires, a cross wire cut-off device on said frame located between one of said side wires and said cross-wire feed rollers, said cut-off device having cut-off knife means in a plane radial to the axis of said cross wire and from at least one side thereof, power means on said frame for reciprocating said knife means in cutting off operation, and side wire cut-off means on said frame located on the opposite side of said welding electrodes from said side wire drive rollers having a trip clutch energizable to cause said knives to cut off said side wires after a predetermined number of cross-wires have been welded thereto, said side wire drive rollers disposed to push and feed said side wires toward said welding electrodes and said wire cut-off means.

5. In a wire joint reinforcing making machine as set forth in claim 4 wherein there is provided a deflectable guide tube for said cross wire located on said frame between said cross wire feed rollers and said cross wire cut-off knives for normally guiding said cross wire in spaced position to one side of said side wires while allowing the deflection of said cross wire from said normally spaced feed position when engaged by said welding electrodes.

6. In a wire joint reinforcing making machine as set forth in claim 4 wherein there is provided a sequence control switch on said frame connected to be driven from said side wire feed rollers so as to be responsive to the movement of said side wires to determine the sequence of operation of said cross wire feed, welding of the cross wire to said side wires, cut-off of said cross wire, and final cut-off of said side wires.

7. In a wire joint reinforcing making machine as set forth in claim 6 wherein said sequence control switch includes a counter mechanism connected therewith to determine the time of side wire cut-off in relation to the number of cross wires welded to said side wires.

8. In a wire joint reinforcing making machine, as set forth in claim 4, wherein there is provided a deflectable guide tube for said cross-wire located on said frame between said cross-wire feed rollers and said cross-wire cut-off knife means for normally guiding said cross-wire in spaced position to one side of said side wires while allowing the deflection of said cross-wire downwardly from said normally spaced feed position when engaged by said welding electrodes, said deflectable guide resiliently disposed to raise said cross-wire and said side wires when welded thereto from a position on said electrodes when one of said electrodes moves away therefrom whereby said deflectable guide carries and moves said welded cross-wire and side wires upward to a position wherein said cross-wire may be sheared off by said cut-off knife means; said deflectable guide tube also normally supports said cross-wire to be projected over said side wires after said cross-wire is cut off and during simultaneous movement of said side wires and said cross-wire.

9. In a wire joint reinforcing making machine the combination of: first and second pairs of wire driving and serrating rollers, each of said pairs including two peripherally serrated rollers having their peripheral portions spaced a lesser distance than the diameter of wire to be engaged therebetween; a driven shaft, one roller of each pair coupled to said driven shaft; drive means for intermittently driving said shaft, said pairs of rollers spaced from each other axially of said shaft; and means for adjusting the peripheral spacing of the rollers of each pair whereby the relative elongation deformation of wires passing between said pairs of rollers may be controlled as the wire is serrated by said rollers.

10. In a wire joint reinforcing making machine the combination of: first and second pairs of wire driving and serrating rollers, each of said pairs including two peripherally serrated rollers having their peripheral portions spaced a lesser distance than the diameter of wire to be engaged therebetween; a driven shaft; one roller of each pair coupled to said driven shaft; drive means for intermittently driving said shaft, said pairs of rollers spaced from each other axially of said shaft; means for adjusting the peripheral spacing of the rollers of each pair whereby the relative elongation deformation of wires passing between said pairs of rollers may be controlled as the wire is serrated by said rollers, said drive means comprising a motor having an output shaft; an electrically controlled clutch coupling said driven shaft and said motor output shaft; and an electrically controlled brake disposed to intermittently stop said driven shaft and said rollers driven thereby.

11. In a wire joint reinforcing making machine the combination of: first and second pairs of wire driving and serrating rollers, each of said pairs including two peripherally serrated rollers having their peripheral portions spaced a lesser distance than the diameter of wire to be engaged therebetween; a driven shaft; one roller of each pair coupled to said driven shaft; drive means for intermittently driving said shaft, said pairs of rollers spaced from each other axially of said shaft; means for adjusting the peripheral spacing of the rollers of each pair whereby the relative elongation deformation of wires passing between said pairs of rollers may be controlled as the wire is serrated by said rollers, said drive means comprising a motor having an output shaft; an electrically controlled clutch coupling said driven shaft and said motor output shaft; an electrically controlled brake disposed to intermittently stop said driven shaft and said rollers driven thereby; and a sequence controlling switch operable to be driven in unison with said driven shaft and having contacts coupled electrically to control said clutch and brake.

12. In a wire joint reinforcing making machine the combination of: first and second pairs of wire driving and serrating rollers, each of said pairs including two peripherally serrated rollers having their peripheral portions spaced a lesser distance than the diameter of wire to be engaged therebetween; a driven shaft; one roller of each pair coupled to said driven shaft; drive means for intermittently driving said shaft, said pairs of rollers spaced from each other axially of said shaft; means for adjusting the peripheral spacing of the rollers of each pair of rollers whereby the relative elongation deformation of wires passing between said pairs of rollers may be controlled as the wire is serrated by said rollers, said drive means comprising a motor having an output shaft; an electrically controlled clutch coupling said driven shaft and said motor output shaft and an electrically controlled brake disposed to intermittently stop said driven shaft and said rollers driven thereby; a sequence controlling switch operable to be driven in unison with said driven shaft and having contacts coupled electrically to control said clutch and brake; a welding head spaced from said pairs of rollers and having electrodes between which wires driven by said pairs of rollers may be disposed; and a third pair of pepripherally spaced rollers disposed axially at an angle to said first and second pairs of rollers and having their spaced peripheries disposed to drive a cross wire between said electrodes and at an angle to said first mentioned wires, said driving and serrating rollers disposed to push said side wires toward said welding head.

13. In a wire joint reinforcing making machine the combination of: first and second pairs of wire driving and serrating rollers, each of said pairs including two peripherally serrated rollers having their peripheral portions spaced a lesser distance than the diameter of wire to be engaged therebetween; a driven shaft; one roller of each pair coupled to said driven shaft; drive means for intermittently driving said shaft, said pairs of rollers spaced from each other axially of said shaft; means for adjusting the peripheral spacing of the rollers of each pair of rollers whereby the relative elongation deformation of wires passing between said pairs of rollers may be controlled as the wire is serrated by said rollers, said drive means comprising a motor having an output shaft; an electrically controlled clutch coupling said driven shaft and said motor output shaft and an electrically controlled brake disposed to intermittently stop said driven shaft and said rollers driven thereby; a sequence controlling switch operable to be driven in unison with said driven shaft and having contacts coupled electrically to control said clutch and brake; a welding head spaced from said pairs of rollers and having electrodes between which wires driven by said pairs of rollers may be disposed; a third pair of peripherally spaced rollers disposed axially at an angle to said first and second pairs of rollers and having their spaced peripheries disposed to drive a cross wire between said electrodes and at an angle to said first mentioned wires, said driving and serrating rollers disposed to push said side wires toward said welding head, a second driven shaft connected to drive one of said third pair of rollers; a second motor having an output shaft; a second electrically controlled clutch disposed to couple said second motor and said second driven shaft; and a second electrically controlled brake disposed to stop rotation of said second driven shaft and said roller of said third pair driven thereby.

14. In a wire joint reinforcing making machine the combintion of: first and second pairs of wire driving and serrating rollers, each of said pairs including two peripherally serrated rollers having their peripheral portions spaced a lesser distance than the diameter of wire to be engaged therebetween; a driven shaft; one roller of each pair coupled to said driven shaft; drive means for intermittently driving said shaft; said pairs of rollers spaced from each other axially of said shaft; means for adjusting the peripheral spacing of the rollers of each pair of rollers whereby the relative elongation deformation of wires passing between said pairs of rollers may be controlled as the wire is serrated by said rollers, said drive means comprising a motor having an output shaft; an electrically controlled clutch coupling said driven shaft and said motor output shaft and an electrically controlled brake disposed to intermittently stop said driven shaft and said rollers driven thereby; a sequence controlling switching means operable to be driven in unison with said driven shaft and having contacts coupled electrically to control said clutch and brake; a welding head spaced from said pairs of rollers and having electrodes between which wires driven by said pairs of rollers may be disposed; a third pair of peripherally spaced rollers disposed axially at an angle to said first and second pairs of rollers and having their spaced peripheries disposed to drive a cross wire between said electrodes and at an angle to said first mentioned wires, said driving and serrating rollers disposed to push said side wires toward said welding head, a second driven shaft connected to drive one of said third pair of rollers; a second motor having an output shaft; a second electrically controlled clutch disposed to couple said second motor and said second driven shaft; and an electrically controlled brake disposed to stop rotation of said second driven shaft and said roller of said third pair driven thereby, said sequence controlling switching means disposed to deenergize said clutches and energize said brakes and substantially concurrently to energize said welding head, and to substantially concurrently energize said clutches and deenergize said brakes after operation of said welding head.

15. In a wire joint reinforcing making machine the combination of: first and second pairs of longitudinal wire driving and serrating rollers, each of said pairs including two peripherally serrated rollers having their peripheral portions spaced a lesser distance than the diameter of wire to be engaged therebetween; a driven shaft, one roller of each pair coupled to said driven shaft; drive means for intermittently driving said shaft, said pairs of rollers spaced from each other axially of said shaft; means for adjusting the peripheral spacing of the rollers of each pair of rollers whereby the relative elongation deformation of said longitudinal wires passing between said pairs of rollers may be controlled as these wires are serrated by said rollers; and a group of wire straightening rollers disposed to guide said longitudinal wires in a controlled plane before being received between each of said pairs of driving and serrating rollers.

16. In a wire joint reinforcing making machine the combination of: first and second pairs of longitudinal wire driving and serrating rollers, each of said pairs including two peripherally serrated rollers having their peripheral portions spaced a lesser distance than the diameter of wire to be engaged therebetween; a driven shaft, one roller of each pair coupled to said driven shaft; drive means for intermittently driving said shaft, said pairs of rollers spaced from each other axially of said shaft; means for adjusting the peripheral spacing of the rollers of each pair of rollers whereby the relative elongation deformation of said longitudinal wires passing between said pairs of rollers may be controlled as these wires are serrated by said rollers; and a group of wire straightening rollers disposed to straighten said longitudinal wires in a horizontal plane after being delivered by each of said pairs of driving and serrating rollers.

17. In a wire joint reinforcing making machine the combination of: first and second pairs of longitudinal wire driving and serrating rollers, each of said pairs including two peripherally serrated rollers having their peripheral portions spaced a lesser distance than the diameter of wire to be engaged therebetween; a driven shaft, one roller of each pair coupled to said driven shaft; drive means for intermittently driving said shaft, said pairs of rollers spaced from each other axially of said shaft; means for adjusting the peripheral spacing of the rollers of each pair of rollers whereby the relative elongation deformation of said longitudinal wires passing between said pairs of rollers may be controlled as these wires are serrated by said rollers; and a group of wire straightening rollers disposed to guide said longitudinal wires in a controlled plane before being received between each of said pairs of driving and serrating rollers and a second group of wire straightening rollers disposed to straighten said longitudinal wires in a horizontal plane after being delivered by each of said pairs of driving and serrating rollers.

18. In a wire joint reinforcing making machine the combination of: first and second pairs of longitudinal wire driving and serrating rollers, each of said pairs including two peripherally serrated rollers having their peripheral portions spaced a lesser distance than the diameter of wire to be engaged therebetween; a driven shaft, one roller of each pair coupled to said driven shaft; drive means for intermittently driving said shaft, said pairs of rollers spaced from each other axially of said shaft; means for adjusting the peripheral spacing of the rollers of each pair of rollers whereby the relative elongation deformation of said longitudinal wires passing between said pairs of rollers may be controlled as these wires are serrated by said rollers; and a group of wire straightening rollers disposed to guide said longitudinal wires in a controlled plane before being received between each of said pairs of driving and serrating rollers and a second group of wire straightening rollers disposed to straighten said longitudinal wires in a horizontal plane after being delivered by each of said pairs of driving and serrating rollers; a welding head disposed to receive said longitudinal wires from said last mentioned straightening rollers; means for feeding cross wire transversely across said longitudinal wires; and guide means disposed between said last mentioned straightening rollers and said welding head accurately to guide said longitudinal wires to maintain precise lateral disposition thereof at their junctures with said cross wire and at said welding head.

(References on following page)

References Cited by the Examiner

UNITED STATES PATENTS

| | | | |
|---|---|---|---|
| 1,074,824 | 10/13 | Wadsworth | 80—30 |
| 1,185,260 | 5/16 | Stine | 226—193 X |
| 1,448,566 | 3/23 | Muller et al. | 140—112 |
| 1,923,369 | 8/33 | Gronemeyer | 140—112 |
| 2,487,392 | 11/49 | Southwick | 140—112 X |
| 2,683,472 | 7/54 | Specht | 140—103 |
| 2,712,837 | 7/55 | Griesemer | 140—112 |
| 2,891,585 | 6/59 | Catini | 140—71 |
| 3,008,496 | 11/61 | Goddard | 140—71 |
| 3,016,451 | 1/62 | Cornell | 226—181 X |
| 3,022,929 | 2/62 | Myers et al. | 226—193 X |
| 3,027,920 | 4/62 | Payne | 140—112 X |

FOREIGN PATENTS

| | | |
|---|---|---|
| 812,021 | 1/37 | France. |

CHARLES W. LANHAM, *Primary Examiner.*

RICHARD A. WAHL, WILLIAM F. PURDY,
*Examiners.*